United States Patent
Newcombe et al.

(10) Patent No.: US 6,349,325 B1
(45) Date of Patent: *Feb. 19, 2002

(54) PRIORITIZED AGENT-BASED HIERARCHY STRUCTURE FOR HANDLING PERFORMANCE METRICS DATA IN A TELECOMMUNICATION MANAGEMENT SYSTEM

(75) Inventors: Adrian Newcombe; Jila Seraj, both of Dublin (IE)

(73) Assignee: Telefonaktiebolaget LM Ericsson (publ), Stockholm (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/097,413

(22) Filed: Jun. 16, 1998

(30) Foreign Application Priority Data

Jun. 16, 1997 (IE) ................................................ 97 0448

(51) Int. Cl.⁷ ............................. G06F 15/16; G06F 1/00
(52) U.S. Cl. ....................... 709/202; 709/223; 709/317; 709/318; 706/10; 706/11; 706/50
(58) Field of Search ................................. 709/200, 224, 709/229, 225, 104, 202, 203, 218, 219, 244, 223, 315, 316, 317, 318, 240; 370/401, 404, 351, 252; 705/39, 26; 714/39; 706/10, 11, 50

(56) References Cited

U.S. PATENT DOCUMENTS

| | | | |
|---|---|---|---|
| 5,488,715 A | | 1/1996 | Wainwright .................... 714/4 |
| 5,537,611 A | | 7/1996 | Rajagopal et al. .......... 379/221 |
| 5,561,790 A | * | 10/1996 | Fusaro ........................ 395/500 |
| 5,619,615 A | * | 4/1997 | Pitchaikani et al. .......... 706/10 |
| 5,644,686 A | * | 7/1997 | Hekmatpour ................. 706/65 |
| 5,774,669 A | * | 6/1998 | George et al. .............. 709/224 |
| 5,872,931 A | * | 2/1999 | Chivaluri .................... 709/223 |

* cited by examiner

Primary Examiner—Mehmet B. Geckil
Assistant Examiner—Beatriz Prieto
(74) Attorney, Agent, or Firm—Burns, Doane, Swecker & Mathis, L.L.P.

(57) ABSTRACT

A telecommunications performance management system for processing, analyzing and abstracting performance data from a traffic machine (3) in real time using a hierarchial structure of a performance agents (10) connected to a user interface (11) to ensure optimum network design and performance. Each agent (10) transmits performance data to a supra agent (10) and operates according to a subscription signal and associated delivery deadline received from the supra agent (10).

20 Claims, 6 Drawing Sheets

PRIORITIZED AGENT-BASED HIERARCHY STRUCTURE FOR HANDLING PERFORMANCE METRICS DATA IN A TELECOMMUNICATION MANAGEMENT SYSTEM

TECHNICAL FIELD OF THE INVENTION

The invention relates to the performance management of a telecommunications network. Such management is very important to ensure that corrective actions are taken when necessary and so that network design can be improved according to usage and performance.

At present, performance management generally involves periodic data capture, and subsequent analysis of the data. The data tends to be captured in very large volumes and in a raw state which is of relatively little benefit to the network manager.

DESCRIPTION OF RELATED ART

Some improvements have been made and, as described in U.S. Pat. No. 5,488,715 (Wainwright). In this specification, historical traffic data is utilised for dynamic and trend analysis. The data flows into an interface module and is reformatted by a data format module for input into a relational database. However, there are limitations imposed by the latency associated with the performance data. Also, processing delays can arise in the data format module as a network grows and traffic increases. It must be remembered that the quantities of data involved are huge. U.S. Pat. No. 5,537,611 (Rajagopal) mentions the objective of receiving real time performance data. However, there is little detail as to how this can be achieved.

SUMMARY

The invention is therefore directed towards providing a telecommunications performance management system which:

provides selected performance views as required at any particular time by a network manager, and provides this information in real time.

In this specification, "real time" means that the activities of the system have a temporal meaning. The time at which activities are complete is important. Typically, these temporal constraints are expressed as deadlines.

According to the invention, there is provided a telecommunications performance management system comprising:

a performance agent comprising means for processing, analyzing end abstracting performance data captured from a traffic machine (TM), and a user interface connected to the agent.

A traffic machine is that part of a network resource which is dedicated to handling of network traffic.

Preferably, the system comprises a plurality of agents connected in a hierarchial manner.

In one embodiment, each agent comprises means for transmitting performance data to a supra agent after performing, processing, analyzing and extracting operations to effectively filter the data.

In one embodiment the operations performed by an individual agent are set by subscription signals which are received from supra performance agents and/or external control systems.

The subscription signal sets the required level of processing in a flexible manner. For example, there may be a large degree of filtering at a low level in the hierarchy, depending on user requirements at particular locations.

It will be appreciated that because the agents are distributed in a hierarchy, the capacity of the management system can be scaled to meet the managed network raw data output and the activities can be distributed in a flexible manner.

Preferably the performance agent incorporates means for processing a priority indicator to assign a relative importance for each subscription.

Preferably each subscription incorporates a delivery deadline.

Ideally each agent incorporates means for dynamically altering the subscription delivery deadline to subordinate agents.

Preferably, performance data is transmitted with event signals transmitted up through the hierarchy from agent to agent.

Ideally performance data is transmitted up through the hierarchy with event signals, Preferably performance data is transmitted with an event data real time deadline.

In a preferred arrangement the management system incorporates means for identifying a performance data characteristic associated with the performance data and processing said data in accordance with the real time deadline.

Preferably, each agent comprises a database and means for storing data for later analysis where this is required.

Preferably each agent comprises an analyzer having means for calculating metrics determining severity of exceptions, comparing metrics against thresholds, analyzing trends, and correlating exception events and performance data.

Preferably each agent incorporates means for assigning a reliability value to received data in response to the output of the analyzer. Preferably each agent incorporates prioritising means for assigning a relative weighted characteristic for subordinate performance agents. Preferably each agent comprises a filter for filtering received event information based on a set of rules set up by the subscription handler. Preferably the system further comprises a management information repository for storing models of the system, managed resources, definition of performance metrics and event data. Preferably the management information repository incorporates means for dynamically updating said models of the system, managed resources and event data.

Preferably a telecommunications performance management system comprising:

a performance agent comprising means for processing, analyzing and abstracting performance data captured from a traffic machine, a user interface connected to the agent; and means for controlling the managed system by receiving real time performance information from the performance agent.

Preferably the controller incorporates means for directing a subscription to a performance agent.

According to one aspect of the invention, there is provided a telecommunications management system comprising a hierarchy of interconnected performance agents having a user interface connected to at least one performance agent and each performance agent comprising:

means for processing, analyzing and abstracting performance data captured from a traffic machine;

means for transmitting the performance data to a supra agent; and means for receiving a subscription from a supra agent to determine a mode of operation.

According to another aspect of the invention, there is provided a method for managing the performance of a telecommunications system comprising the steps of:

capturing performance data from a traffic machine of the telecommunications system by a performance agent; and processing, analyzing and abstracting the performance data in the performance agent to control operation of the telecommunications system.

Preferably, the step of capturing performance data further comprises the steps of:

retrieving raw traffic data produced by the traffic machine in response to traffic handling;

transmitting the retrieved data over a high speed interface to a filter; and filtering selected portions of the raw data before re-formatting the filtered raw data to produce performance data relating to the telecommunications system.

Ideally, the method further comprises the steps of:

assigning a weighting factor to a metric component of the performance data to produce weighted performance data; and communicating the weighted performance data to a supra agent.

Preferably, the method further comprises the steps of:

calculating performance statistics in the performance agent; and upon receipt of a request from a connected performance agent, transmitting the performance statistics to the connected performance agent.

In one embodiments the performance agent conducts the steps of:

retrieving interaction information from a local memory to set an activity requirement for the performance agent; and upon receipt of a subscription from a supra agent updating the interaction information to change the activity requirement for the performance agent.

Preferably, the performance agent conducts the further step of identifying a priority indicator and a delivery deadline associated with the subscription and assigning a relative importance to the subscription.

Preferably, the performance agent performs the step of dynamically altering the subscription delivery deadline and transmitting the subscription with the altered delivery deadline to a subordinate performance agent.

Preferably, the method further comprises the step of transmitting performance data up through a hierarchy of performance agents with event signals having an event data real time deadline.

Ideally, a supra agent receiving the event signals performs the steps of:

identifying a performance data characteristic from the performance data; and processing said data in accordance with the received real time deadline.

BRIEF DESCRIPTION OF THE DRAWINGS

The invention will be more clearly understood from the following description of some embodiments thereof, given by way of example only, with reference to the accompanying drawings, in which.

DETAILED DESCRIPTION OF EMBODIMENTS

Figure 1:
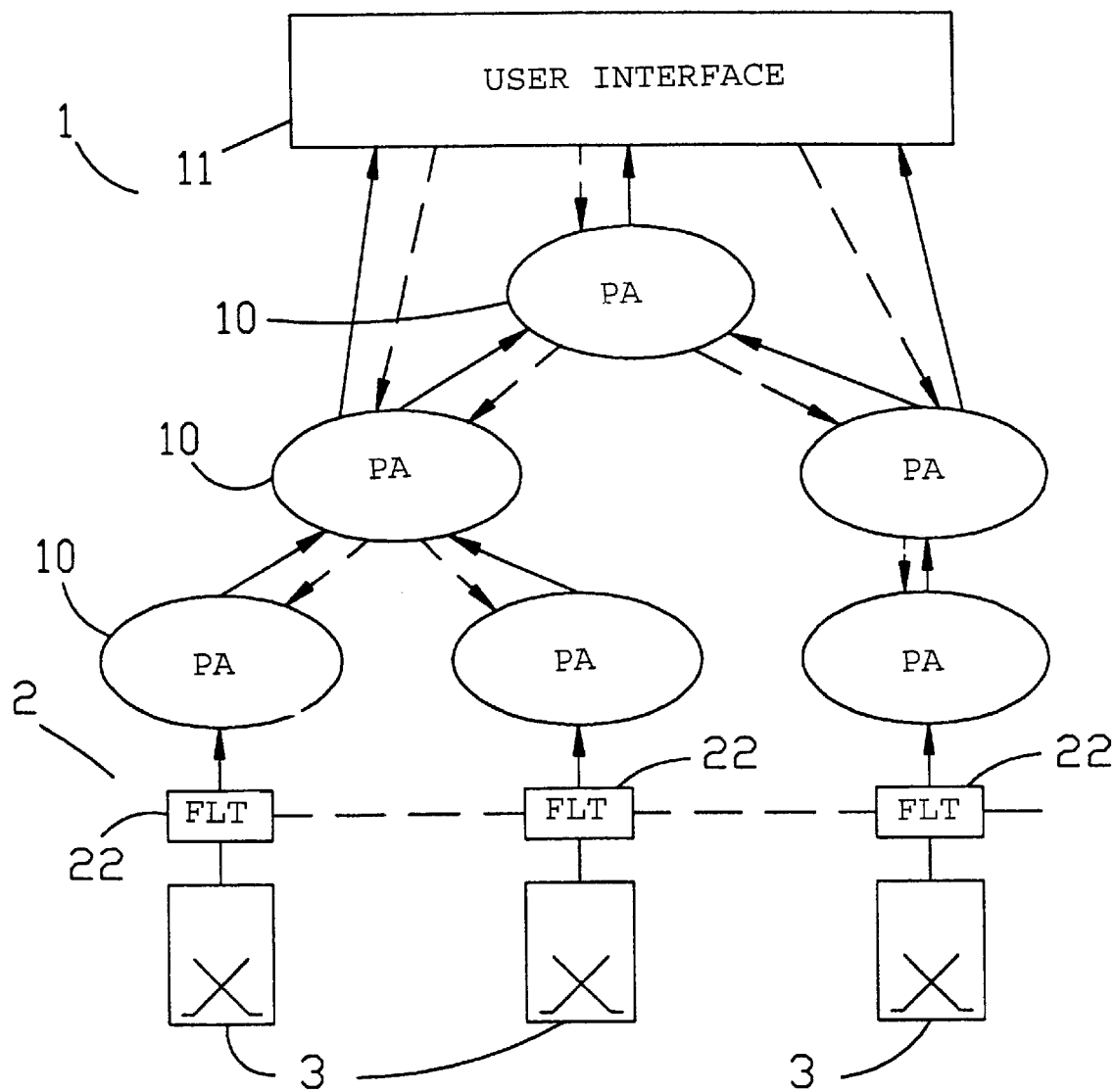
FIG. 1 is a schematic representation of a performance management system of the invention.

Referring initially to FIG. 1, there is shown a performance management system 1 for measurement of the performance of a managed telecommunications network 2 having traffic machines 3. The traffic machines 3 perform traffic handling and produce raw traffic data which is used as the basis for performance data. The raw data is transmitted over a high-speed interface and is received by a filter 22 which forms the logical boundary between the system 1 and the managed network 2. The filter 22 acts as a gateway or mediation device for real time performance of the management system. Thus, unnecessary data may be readily discarded while also reformatting data from the raw format to one which may be used by the management system.

The system 1 comprises a hierarchy of performance agents 10. Each agent 10 is responsible for the processing, analysis and abstraction of the performance data received from the traffic machines 3 or lower level agents 10. Agents 10 at any level of the hierarchy may be connected to a user interface 11 which presents the information to a user. The arrangement of the user interface is quite flexible, for example, there may be an interface associated with each agent and a centralised interface may be connected to more of the agents than is illustrated in is FIG. 1.

An authority is the management system responsible for a domain, the domain being defined as a unit of responsibility of abstraction which may optionally be taken to include any and all sub-ordinate domains in the hierarchy.

The upwardly-directed arrows indicate flow of event signals, whereas the downwardly-directed arrows indicate flow of subscription signals instructing the agents. These subscription signals are described in detail below.

Figure 2:
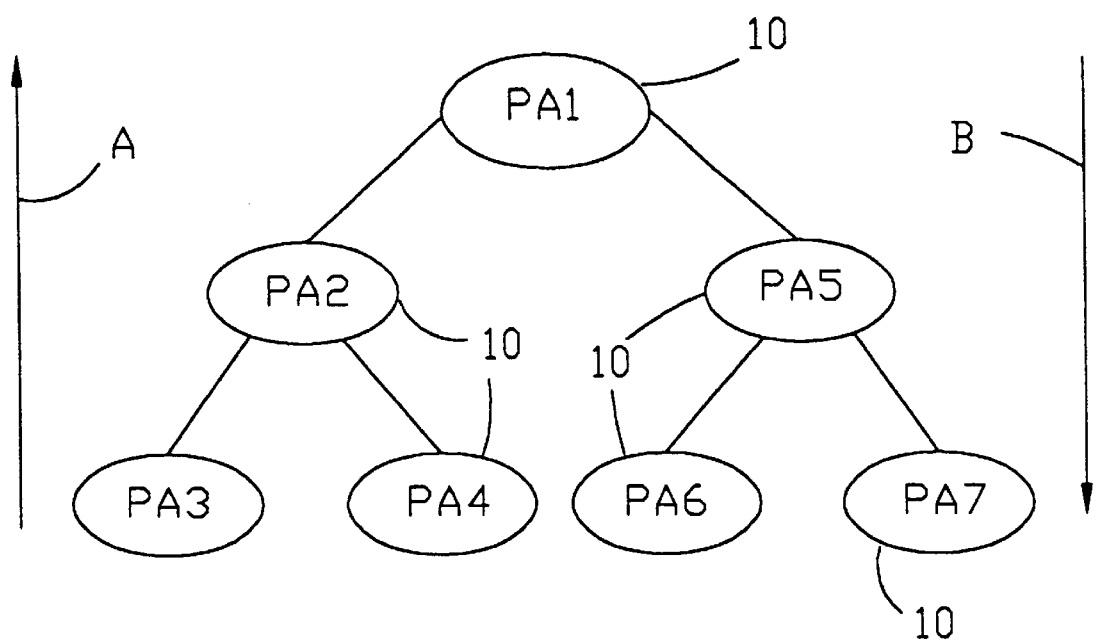
FIG. 2 is a diagram illustrating the manner in which Information is abstracted in the hierarchy of performance agents.

In principle, the level of abstraction increases as one traverses up the hierarchy (indicated by the arrow A) and the amount of global knowledge decreases as one traverses down the hierarchy (indicated by the arrow B). At the sane timer the level of detailed knowledge of the network resources decreases as one traverses up the hierarchy (A). These principles are illustrated in FIG. 2.

Each agent 10 reports a small pre-defined set of performance metrics as a minimum to its parent in the hierarchy, which in turn uses the received data to generate the same set of metrics for itself. This set of metrics taken together with a set of defined threshold values specify a set of states for the network. These states are a meaningful abstraction of the current condition of the network resources and form the basis for network monitoring and control activities.

As each agent 10 at each level in the hierarchy is required to generate the same set of metrics then each agent 10 must understand the contribution of the metric values it receives from its subordinate agents 10 and incorporate these into a value to be sent up to the parent agent 10. This is achieved through use of a weighting function which is best explained through use of an illustrative example. Consider the trivial situation as shown in FIG. 2, where there is a three layer hierarchy of agents 10 corresponding to cells, region and network. If one of the metrics being generated is congestion then each of the agents 10 will be required to generate a congestion value. The value of congestion generated by PA2 will be based on the values received from PA3 and PA4. However, PA3 and PA4 may be cells with very different characteristics, say PA3 is a busy cell in the commercial district of a city, while PA4 is a cell in a low populated rural area. Obviously, the value of congestion generated by PA2 should be biased in favour of the value received from PA3 even if this value is lower than that received from PA4. In this way, a truer picture of the overall congestion in the region related to PA2 is present to PA1.

This means that each agent 10 in the hierarchy which has a set of children must calculate their metrics using a weighted combination of the performance metrics received from its children. This can be expressed mathematically as $$\text{Value}_{level\,i} = \underset{All\,subordinate\,agent_j}{F} (w^i_j \text{value}_j), \forall\,j \text{ and } \sum w^i_j = 1, \forall\,i, j$$

in which $W^i_j$ is the weight applied by agent i to metrics from agent j.

In addition to the generation of the performance metrics, each agent 10 may also be required to calculate a set of performance statistics. These performance statistics are lower in level than the performance metrics and are only sent to another agent 10 on request. The agent 10 may also calculate some statistics on request and store them locally for future retrieval by another agent.

An important aspect of the invention is the ability to analyze network failure conditions in conjunction with performance information to determine the actual severity of the failure condition. Events relating to failure conditions are called exception events and these events are generated either by the traffic machines when they detect a hardware/software fault, or by an agent 10 when a performance threshold is crossed. Once an agent 10 receives an exception event, it correlates it with the performance information to determine how severe the exception condition is. This correlation is called the severity function and it takes into account the nature of the failure condition, the measured (or anticipated) effect on the performance of the network, the configuration of the underlying ,resources (e.g. a failure of a backup antenna may not be an urgent condition), the weighting factor described earlier (e.g. loss of a rural cell is not as crucial as the loss of a cell in the commercial quarter of a city), in addition to other factors which might be defined by an operator.

Because the management network contains a hierarchy of agents 10, each with a higher level and wider view of the network resources then the severity of a particular exception event could be measured and correlated by different agents 10 at different levels in the hierarchy. Each agent 10 could send its' view of the severity to a maintenance management system which based on the severity will prioritise maintenance activities accordingly.

Depending on how the hierarchy is organised, it may happen that an agent 10 from more than one superior authority is interested in the information being generated by an agent 10 in a lower level authority. This effectively means that an agent 10 could be interacting with more than one superior agent 10. This is not a problem for the hierarchy of agents 10, but it is assumed that a particular agent 10 gives preference in reporting information to its own authority and to the parent authority in the control hierarchy. In other words, the invention is so defined that it is flexible to fit into a strict hierarchy of authorities or a looser network of authorities. How the control hierarchy is arranged is not constrained. However, the relative importance of each subscriber to a particular agent 10 must be represented by the agent. This is achieved by use of a priority rating scheme in each agent 10.

There are two different types of interaction between the agents 10, namely, subscription interactions which set the activity required by an agent and event passing interactions which are used for passing the performance data. A subscription may instruct an agent to store some information in its database such as periodic statistical reports, or an exception event relating to a particular failure condition.

An agent can subscribe to two types of events, namely, periodic performance events and exception events, referred to in the specification as periodic subscriptions and exception subscriptions. In the case of the former, the subscription message must contain a specification of the timing constraints related to the subscription. In some cases, the agent receiving the subscription may find that it is unable to meet these timing constraints due to the extra load that it would place upon the agent and the load already on the agent. For this reason, the subscription interactions are confirmed (i.e. the subscriber receives a reply indicating whether the agent accepts the subscription or not).

In the case of the exception subscriptions the subscriber must specify the nature of the exception event as part of the subscription. An exception subscription effectively tells the receiving agent 10 under what circumstances to generate exception events and where to send them. The subscription could be as simple as a specification of the particular type of events to send, or could contain some filter expression which when evaluating to true the corresponding exception is sent to the subscriber.

In order for agents to tell the agent 10 the particular information which is required, then it is necessary that both share a common notation for describing the performance information and filtering expressions for events. This notation or language is used as part of the subscription messages and describes to the receiver the particular performance information which is required as part of the subscription.

Subscription messages do not have real time requirements on them.

This has the following advantages:

The use of subscriptions between consumers of performance information and performance agents allows significant flexibility to subscribers in gaining access to and specifying the performance information they require.

The use of subscriptions also allows a receiving performance agent to analyze new requirements in terms of the loads they will place upon the agent. This means that the performance agent can ensure that it will meet the subscriptions that it accepts. In this way, the network of performance agents cannot be overloaded by subscriptions which cannot be met.

The passing of performance and exception information between the agents 10 and other agents is achieved by event passing. There are two types of events: exception events which report exceptional conditions in the network (e.g. performance threshold passed, or equipment failure) and periodic events which are evaluations of particular performance metrics at a particular instant in time. The event passing should occur in real (or close to real) time, but as will be seen in the next section the real time requirements differ for periodic and exception events.

The use of events as the medium for reporting of performance information allows the information to be exchanged immediately it is required, rather than being stored and retrieved later as is often the case in current systems.

There is often a confusion between what is meant by a real time system and a high performance system. In a real time system information or tasks have a temporal meaning—it is not just the information or task which is important but also the time at which the information is available or the task is complete. In a high performance system, the information is available or the task is complete in a short period of time. In the real time system, the activity may not be complete in a short period of time, but should complete before a deadline. In other words, the difference between the real time system and the high performance system is that the real time system has timing constraints In the form of deadline which should be met, while a high performance system performs its activities fast but does not give any guarantees about when the activity will be complete.

In general, there are three types of real time systems which are categorised by the deadlines which are required:

1. A hard real time system is one in which it is critical that the system responds to its inputs within the specified deadlines. The consequences of missing a hard deadline are catastrophic.
2. A soft real time system is one in which the response times of the system are important but the system will still function if the deadlines are missed. Thus, a soft deadline will often have a few characteristics which describe the deadline. For example, these could include the deadline itself, the upper bound on the probability of missing the deadline, an upper bound on the lateness of the delivery.
3. A firm real time system is a variation of a soft real time system. The firm real time system will recover from a missed deadline but once the deadline is missed, the activity is stopped. It is important to note that the obvious objective is to meet these deadlines but failure to do so is not catastrophic.

As mentioned above, the real time requirements are purely on the reporting of event based information on the status of the network. The subscription interactions do not have any real time requirements associated with them. There are two types of real time information to be reported and each has different real time requirements:

1. The periodic performance which is generated by each performance agent in response to its subscriptions. It can be seen that the periodic information has firm deadlines, in that, once the data has passed the deadline then it is effectively discarded by the real time system (the same piece of data may be stored for future analysis in a database but this activity does not have a real time requirement).
2. The exception event information which are generated either by the TMs in response to hardware/software failure conditions or by agents 10 when a performance threshold is crossed. The exception information has slightly different temporal requirements to the periodic performance information. The exception information does not have the same ephemeral characteristics as the periodic information. The periodic information (as mentioned above) has a lifetime of some small multiple of the sampling period. The exception events have a lifetime which is (for the most part) the same as the failure condition which raised it. Thus, while it is important to send the exception event to its subscriber as soon as is possible, there is not an implicit deadline associated with an exception. Consequently, we can say that we would like all exception events to be received by their subscribers within some time period of their occurrence. This would essentially form a soft deadline which could be violated, but late exceptions will not be discarded.

Figure 3:
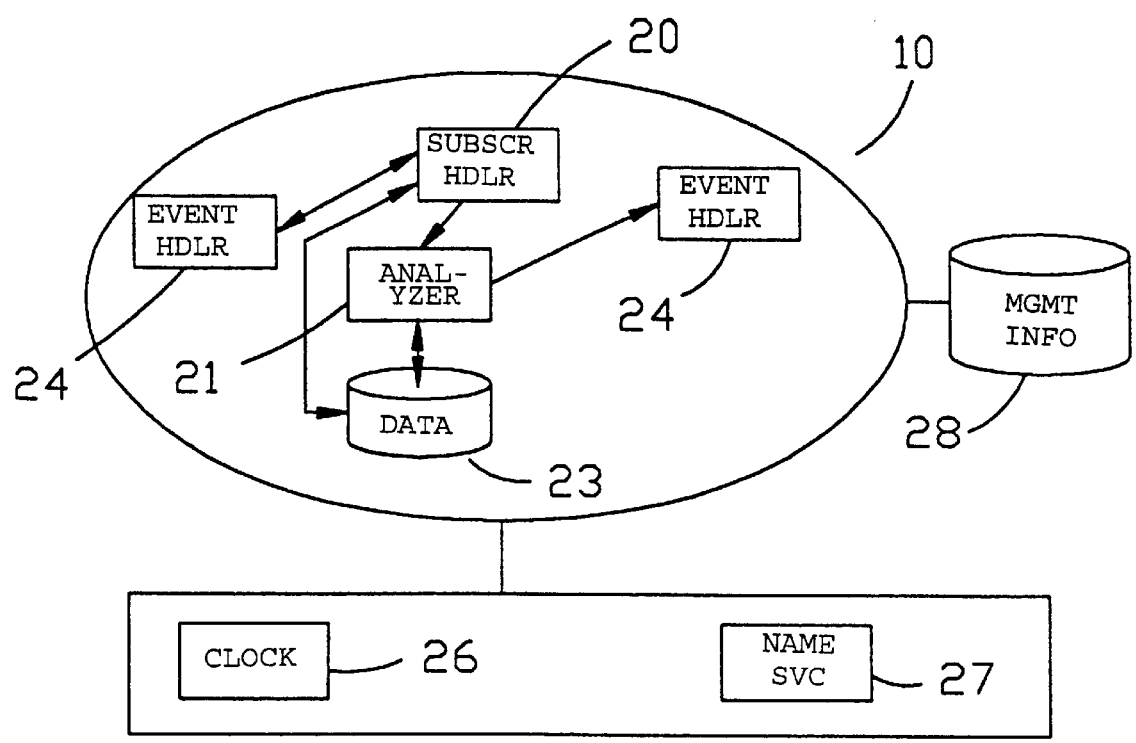
FIGS. 3 and 4 are diagrams illustrating constructions of agents of the system.

Referring now to FIG. 3, construction of a particular agent 10 is illustrated. The following are the components.

A subscription handler 20, which has the responsibility for handling incoming subscriptions and determines whether the agent 10 can deliver the required information. This decision is based on whether the underlying information is available within the agent or from subordinate agents 10 and whether the agent 10 itself is able to meet the deadline associated with the subscriptions. This last decision is taken in conjunction with the scheduler and may also be based on interactions with subordinate agents 10 for source information.

An important part of the subscription handler is mapping from the specification language in the subscription to the underlying information contained in the agent 10. If a subscription is accepted, the handler modifies the parameters of the filter and sets up any required subscriptions to subordinate agents 10, The subscription handler supports the non real time communications interfaces for agents 10.

An analyzer 21 which calculates the metrics, determines the severity of exception, compares metrics against thresholds, analyses trends and correlates exception events and performance data, each having a certainty value describing the accuracy of the data.

A database 23 which stores the analyzed information and selected raw information as required by the agent 10. The information which is to be stored is specified by supra agents via a subscription, and by the local agent 10 itself. It is assumed that there is a default set of information which each agent 10 stores.

An event handler 24 which performs prioritisation and the scheduling of the transmission of the events to be sent from the agent having regard to the associated certainty value. The event handler supports the real time communications interface for the agent 10.

A task scheduler 24 which is responsible for the scheduling of tasks within the performance agents so that task deadlines are met. The scheduler has the ability to schedule the tasks using a real time scheduling algorithm (e.g. earliest deadline first or least slack time). The scheduler should also understand the relative importance of tasks to each other (i.e. the ability to assign different priorities to the tasks). The scheduler has access to the network clock for consistency of time.

In addition to the components of the performance agent, the following components are assumed to be a part of the underlying authority platform. It is assumed that they are consistent across the whole of the system.

A clock 26 which gives the agent 10 access to the system wide "real time" clock, thus ensuring that the distributed agents all have the same consistent view of time. This is an extremely important part of the invention and is essential for the real time behaviour of the measurement system.

A naming service 27 which provides consistent system wide names for the performance agents and the resources which they manage.

A management information repository 28, which is a database storing the following information:

Model of the management system

Model of the managed resources

Model of the raw traffic and exception event data

Model of the operator defined metrics/states and exception event data.

This database is needed to ensure the consistency of the above mentioned information across the management network.

Also, other management agents such as control agents may use the information repository.

Figure 5:
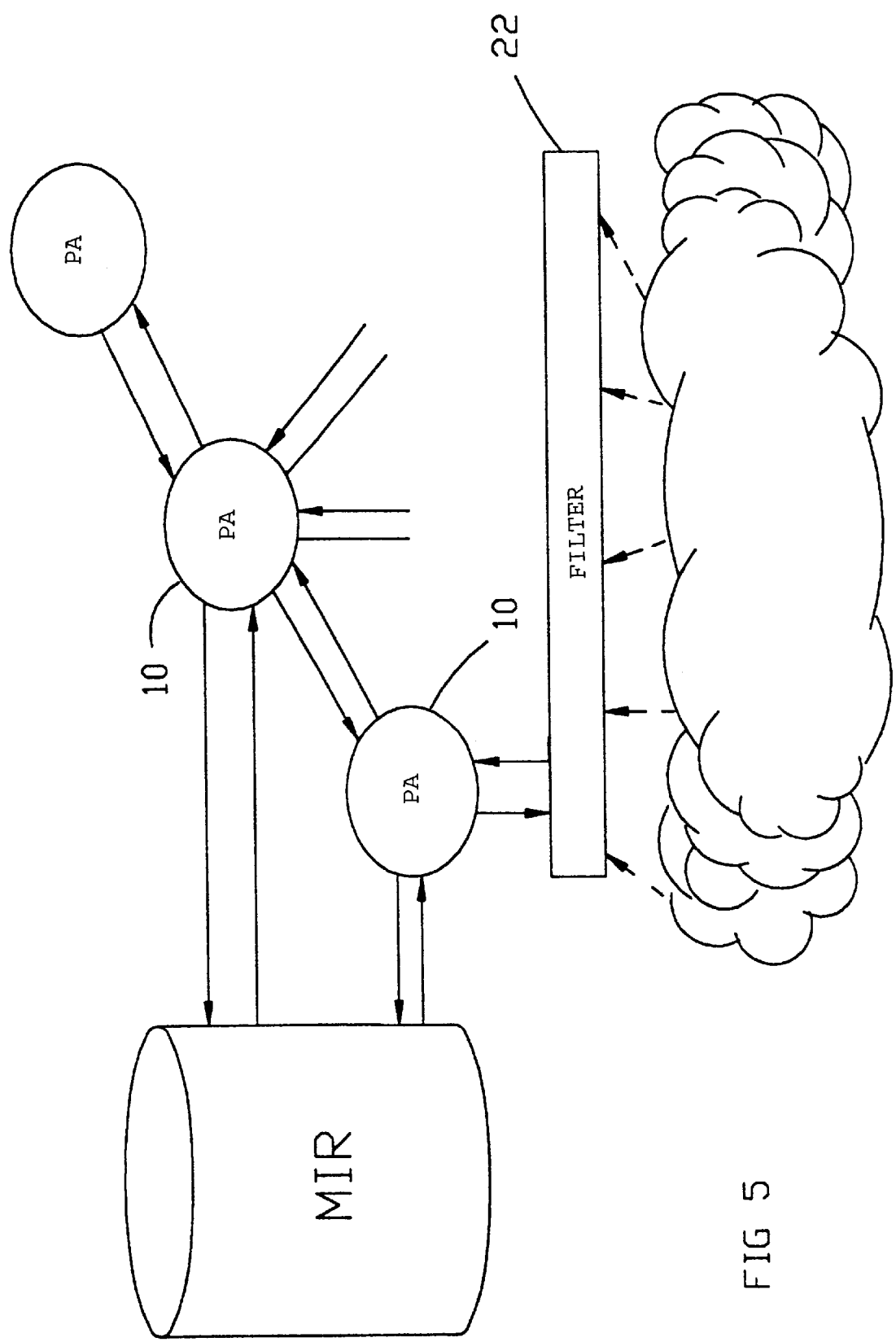
FIG. 5 is a diagram illustrating a subscription process.

The task of the management information repository (see FIG. 5) is to receive and store the definition of the above mentioned information from the operator and provide it to the agents. Other agents such as a control agent in need of management and managed network information can access this repository. Therefore, the information repository has two distinct interfaces, one towards the GUI/operator and one towards the agents.

The interface towards GUI/operator is used for the definition of the models and metrics/states/exception events.

The interface towards the performance agent is used to respond to queries regarding the management network seen from that performance agent, the resources it monitors, providing metrics/states/exception event expression and updating the performance agent of changes in the management network related to that agent and the monitored resources of that agent. Other management agents may use the repository for information regarding the management network and the managed resources by performance agents.

There are no real time requirements on the activities of the information repository. As agents are working in real time, they may keep a copy of relevant management information. In order to keep consistency of data, each agent can refer only to changes of relevant information in the repository.

The repository provides the advantage of consistency of management information and performance data definition is maintained. It also enables "hot updates"—new measurements can be defined without restarting or recompiling agents.

An important aspect of any real time system is the ability to predict the behaviour of the system. In particular, the prediction of the temporal behaviour of the system is important. For a single performance agent operating on a dedicated computer this is quite challenging, but it is very unlikely that a single performance agent would have a dedicated computer. Instead the performance agents will have to reside with other performance agents on the same workstation and share and contend for the same resources (e.g. processor, communications links, etc.). This means that common aspects of the performance agents should be centralised into a performance agent shell which then offers these facilities as performance agent services. The agent specific logic (i.e. abstraction, and modelling functions) then utilise these services.

An example of the subscription process between the performance agents 10 and the management information repository (MIR) is described in more detail. When an agent requires real time information on a managed resource, the agent sends a request to the responsible performance agent 10. The performance agent 10 queries the MIR to determine how to evaluate the requested data. The performance agent receives a response, containing the elements of the subscription for the specified performance data and managed response if found in the MIR or an error if not located. This error triggers an error in the performance agent which is transmitted to the subscribing agent. Such an error may occur when the performance data is not defined in the MIR. When a suitable response Is received from the MIR, the performance agent continues the subscription process.

The PA first checks if it can meet the requested deadline. If the deadline cannot be met, PA sends a negative answer to the subscribing agent. If the response from the MIR indicates that the PA needs additional data from some of its subordinates, it formulates new subscription requests and sends them to the appropriate performance agents. When formulating the new subscription requests, the PA calculates how much time it can give to its subordinates to perform their part of the task and still meet the deadline. This new deadline is sent in the subscription requests. This process continues until the filter receives the subscription request. An important feature of the invention is the dynamic real-time calculation at available deadlines to subordinate performance agents.

When the filter receives the subscription request, it checks again with the MIR to find out what the requested performance data means and how it should map the performance data generated by TM. If the subscription makes sense and if it can meet the given deadline, it sends a positive acknowledgement to the subscribing agent, otherwise a negative acknowledgement is sent.

Whenever a PA sends a positive acknowledgement, it starts scheduling the activity and continues reporting until the subscription is cancelled.

Figure 4:
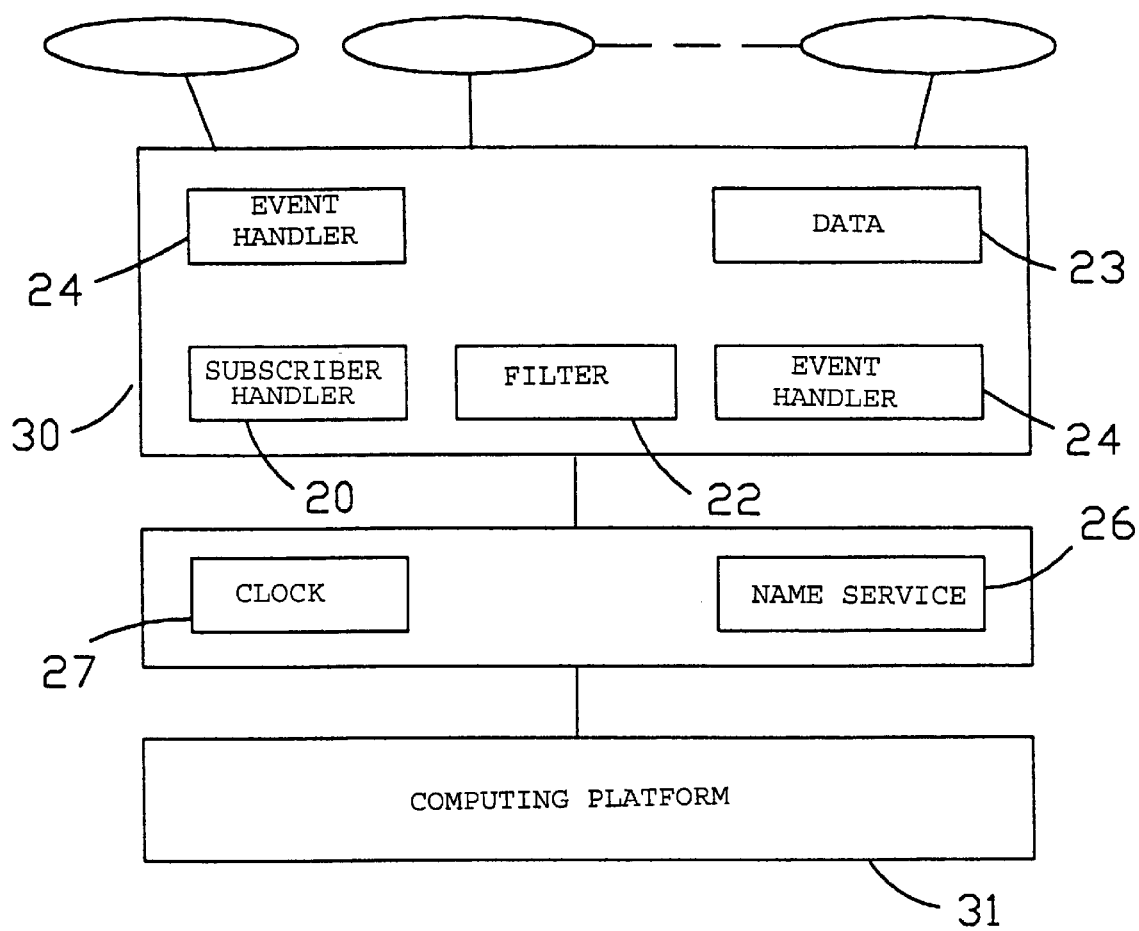

Referring to FIG. 4, a shell 30 is illustrated on a computing platform 31. The individual components are as described with reference to FIG. 3.

An important aspect of the invention is the fact that agents gather data from subordinate agents, thus allowing filtering of information in a progressive manner and abstraction to the required level. Transmission of the subscription signals sets the operation for a particular agent and this provides a large degree of versatility. For example, a user interface could be connected directly to an agent at a low level in the hierarchy thus providing a large degree of low-level data where this is required. At the same time, there could be a large degree of filtering at an agent in the low level of the hierarchy to provide abstraction at a low level where this is required. The important point is that there is a large degree of versatility with the system.

Figure 6:
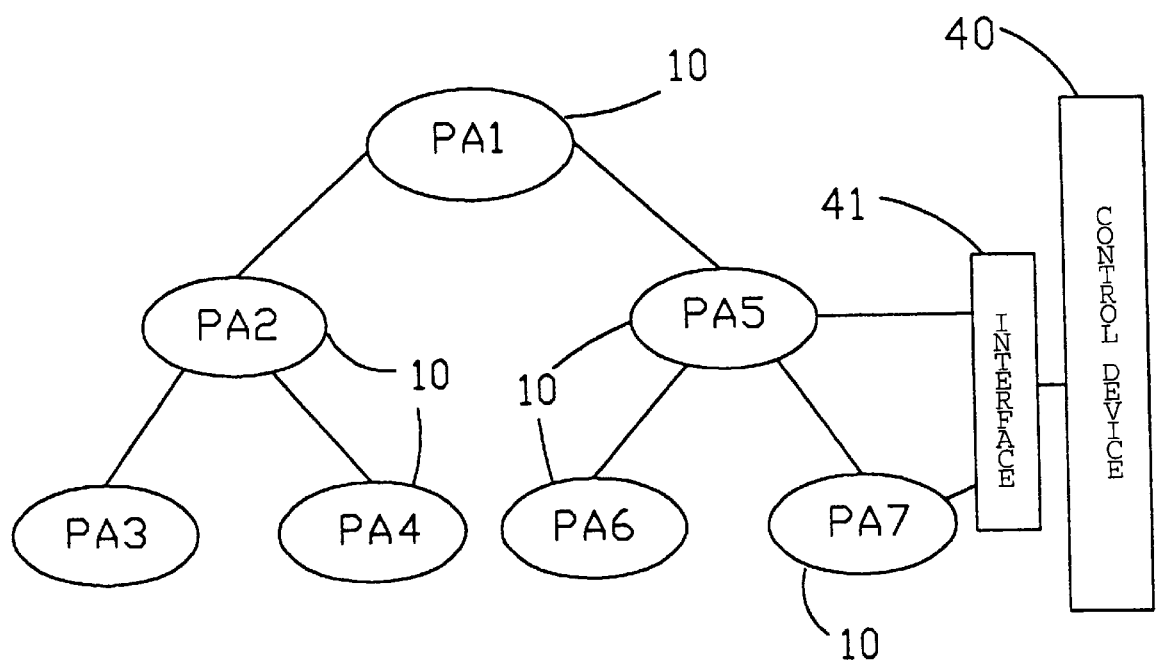
FIG. 6 is a diagram similar to FIG. 2 illustrating a hierarchy control interface formed in accordance with the invention.

Referring to FIG. 6, there is shown an alternative arrangement to that described with respect to FIG. 2, wherein similar components are identified by the same reference numerals generally. The performance agents 10 are arranged as before with the same characteristic levels of abstraction and network knowledge. In this case, the performance agents 10 pass information to a control device 40 through an interface 41. This is an important feature of the invention allowing data to be communicated with an external control device. The control device may respond to this information by generating subscriptions.

Because the system comprises decentralised agents, the resources are spread out and are scalable to meet the volume of performance data captured from the traffic machines. This allows true real tune performance and allows resilience to such things as sudden bursts of information which would otherwise cause overload situations to arise. The system of the invention can also provide a view of the network performance which is temporally consistent across the network. Further, measurements activities can be prioritised according to their relative importance.

It will be appreciated that the subscription passing between subscribing and performance agents, must of necessity have a subscription priority indicator. This subscription priority indicator is made up of two distinct components. The first component indicates the relative importance assigned by the subscribing or performance agent to the subscription and the second component defining a precedence level for the agent within the management network.

Another advantage of the invention is the fact that granularity of measurement can be significantly lower than the prior art.

The invention is not limited to the embodiments hereinbefore described, but may be varied in construction and detail.

We claim:

1. A telecommunications performance management system having a plurality of performance agents connected in a hierarchical structure in which performance agents at a lower level of the hierarchy transmit performance data to performance agents higher up in the hierarchy, at least one performance agent being connected to a user interface, each performance agent comprising:

means for capturing the performance data from a traffic machine of the system;

means for processing the performance data by assigning a priority indicator of relative importance for a subscription signal received from a performance agent higher up in the hierarchy;

means for analyzing the performance data by calculating performance metrics from received event information, determining the severity of the event information, comparing the performance metrics against pre-defined thresholds, and analyzing trends in the performance data;

prioritizing means for assigning a relative weighted characteristic to subordinate performance agents at a same level in the hierarchy, wherein each assigned relative weighted characteristic is combined with respective calculated performance metrics to bias the respective performance metrics in favor of metrics received from subordinate performance agents having assigned relative weighted characteristics of greater priority;

means for generating exception events based on the biased performance metrics;

means for correlating the exception events with the performance data, to provide metric values having associated severity functions;

a filter for accepting the metric values and associated severity functions of the analysis, the filter including means for deciding what metric values and associated severity functions are to be transmitted to a next performance agent higher up in the hierarchy based on information included in the subscription signal; and a controller for controlling the operation of the system.

2. The telecommunications performance management system as claimed in claim 1, wherein the operations performed by an agent are set by each subscription signal which are received from performance agents.

3. The telecommunications performance management system as claimed in claim 2, wherein the subscription signals set filtering of performance data at the lower levels of the hierarchy.

4. The telecommunications performance management system as claimed in claim 1, wherein each subscription signal incorporates a delivery deadline.

5. The telecommunications performance management system as claimed in claim 4, wherein each agent incorporates means for dynamically altering the subscription delivery deadline to subordinate agents.

6. The telecommunications performance management system as claimed in claim 1, wherein performance data is transmitted up through the hierarchy with event signals.

7. The telecommunications performance management system as claimed in claim 1, wherein performance data is transmitted with an event data real time deadline.

8. The telecommunications performance management system as claimed in claim 7, wherein the management system incorporates means for identifying a performance data characteristic associated with the performance data and processing the data in accordance with the real time deadline.

9. The telecommunications performance management system as claimed in claim 1, wherein each agent comprises a filter for filtering received event information based on a set of rules set up by a subscription handler.

10. The telecommunications performance management system as claimed in claim 1, farther comprising a management information repository for storing models of the system, managed resources, definition of performance metrics and event data.

11. The telecommunications performance management system as claimed in claim 10, wherein the management information repository incorporates means for dynamically updating the models of the system, managed resources and event data.

12. The telecommunications performance management system as claimed in claim 1, further comprising:

means for transmitting the performance data to the performance agent; and means for receiving the subscription signal from the performance agent to determine a mode of operation.

13. A method for managing the performance of a telecommunications system comprising the steps of:

arranging a plurality of performance agents in a hierarchy whereby subordinate performance agents at a lower level transmit performance data to performance agents at a higher level in the hierarchy;

capturing performance data from a traffic machine of the telecommunications system by the performance agents at the lower level of the hierarchy;

processing the performance data by assigning a priority indicator to a subscription signal associated with a performance agent higher up in the hierarchy;

analyzing the processed performance data by calculating performance metrics from received event information, determining the severity of the event information, comparing the performance metrics against predetermined thresholds, and analyzing trends in the performance data;

assigning a relative weighted characteristic to subordinate performance agents at a same level in the hierarchy, wherein each assigned relative weighted characteristic is combined with respective calculated performance metrics to bias the respective performance metrics in favor of metrics received from subordinate performance agents having assigned relative weighted characteristics of greater priority;

generating exception events based on the biased performance metrics;

correlating the exception events with the performance data to provide metric values having associated severity functions; and abstracting the performance data by filtering the metric values and associated severity functions to be transmitted to a next performance agent higher up in the hierarchy, based on information included in the subscription signal.

14. The method as claimed in claim 13, wherein the step of capturing performance data includes the steps of:
- retrieving raw traffic data produced by the traffic machine in response to traffic handling;
- transmitting the retrieved data over a high speed interface to a filter; and
- filtering selected portions of the raw data before reformatting the filtered raw data to produce performance data relating to the telecommunications system.

15. The method as claimed in claim 13, further comprising the steps of:
- calculating performance statistics in the performance agent; and
- transmitting the performance statistics to the connected performance agent upon receipt of a request from a connected performance agent.

16. The method as claimed in claim 13, wherein the performance agent performs the steps of:
- retrieving interaction information from a local memory to set an activity requirement for the performance agent; and
- updating the interaction information to change the activity requirement for the performance agent upon receipt of a subscription signal from a performance agent.

17. The method as claimed in claim 16, wherein the performance agent further performs the step of identifying a priority indicator and a delivery deadline associated with the subscription signal and assigning a relative importance to the subscription signal.

18. The method as claimed in claim 16, wherein the performance agent further performs the step of dynamically altering the subscription signal delivery deadline and transmitting the subscription signal with the altered delivery deadline to a subordinate performance agent.

19. The method as claimed in claim 16, further comprising the step of transmitting performance data up through a hierarchy of performance agents with event signals having an event data real time deadline.

20. The method as claimed in claim 19, wherein a performance agent receiving the event signals performs the steps of:
- identifying a performance data characteristic from the performance data; and
- processing the data in accordance with the received real time deadline.

* * * * *